(12) United States Patent
Chen

(10) Patent No.: US 12,155,920 B2
(45) Date of Patent: Nov. 26, 2024

(54) CAMERA ASSEMBLY, METHOD FOR MANUFACTURING SAME, AND TERMINAL DEVICE

(71) Applicant: TRIPLE WIN TECHNOLOGY(SHENZHEN) CO. LTD., Shenzhen (CN)

(72) Inventor: Shu-Ying Chen, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 125 days.

(21) Appl. No.: 18/073,253

(22) Filed: Dec. 1, 2022

(65) Prior Publication Data

US 2023/0199293 A1    Jun. 22, 2023

(30) Foreign Application Priority Data

Dec. 16, 2021   (CN) .......................... 202111545295.7

(51) Int. Cl.
*H04N 23/55* (2023.01)
*H04N 23/54* (2023.01)

(52) U.S. Cl.
CPC ............. *H04N 23/55* (2023.01); *H04N 23/54* (2023.01)

(58) Field of Classification Search
CPC ........ H04N 23/55; H04N 23/54; H04N 23/57; B25B 11/005
See application file for complete search history.

(56) References Cited

U.S. PATENT DOCUMENTS

| 7,190,404 B2* | 3/2007 | Shinomiya | ........ H01L 27/14625 348/340 |
| 2006/0243884 A1* | 11/2006 | Onodera | ................ H04N 23/54 348/E5.027 |
| 2018/0247750 A1* | 8/2018 | Hou | ...................... H01F 7/1646 |

FOREIGN PATENT DOCUMENTS

CN         1839620         9/2006

* cited by examiner

*Primary Examiner* — Yogesh K Aggarwal
(74) *Attorney, Agent, or Firm* — ScienBiziP, P.C.

(57) ABSTRACT

A camera assembly able to perform spectral imaging includes a flexible cable, a filter, a bearing block, and a lens module. The flexible cable is electrically connected to the filter. The bearing block includes intercommunicating first and second receiving grooves. The filter is in the first receiving groove and the lens module is in the second receiving groove. The filter and the bearing block are connected by elastic and shock-absorbent glue and the filter is of the MEMS-type and voltage-tunable to adjust the wavelengths of light permitted to go through to the light sensor, to as to achieve spectral imaging.

14 Claims, 10 Drawing Sheets

CAMERA ASSEMBLY, METHOD FOR MANUFACTURING SAME, AND TERMINAL DEVICE

FIELD

The subject matter herein generally relates to spectral imaging technology, specifically a camera assembly, a method for manufacturing the camera assembly and a terminal device using the camera assembly.

BACKGROUND

Spectral imaging obtains imaging information in multiple dimensions, detecting and obtains a cube of data composed of two-dimensional spatial information and one-dimensional spectral information of a measured scene. Spectral images of different targets are obtained through data processing. The spectral image is an image containing spectral information of a specific wavelength.

Traditional camera assemblies for capturing spectral images can include a filter and a lens module. The lens module includes, for example, a lens and an imaging sensor. The filter filters the collected and mixed light, and retains the light of a specific wavelength band, so that only the light at a specific wavelength band propagates to the imaging sensor. The imaging sensor is used to acquire an image corresponding to the light of the specific wavelength band. The filter is a precise optical element and deformation caused by external stress for example will affect how the filter performs its filtering function.

Preventing any stress on the filter by the body of the camera during assembly is problematic.

BRIEF DESCRIPTION OF THE DRAWINGS

Implementations of the present disclosure will now be described, by way of embodiment, with reference to the attached figures.

DETAILED DESCRIPTION

Figure 1:
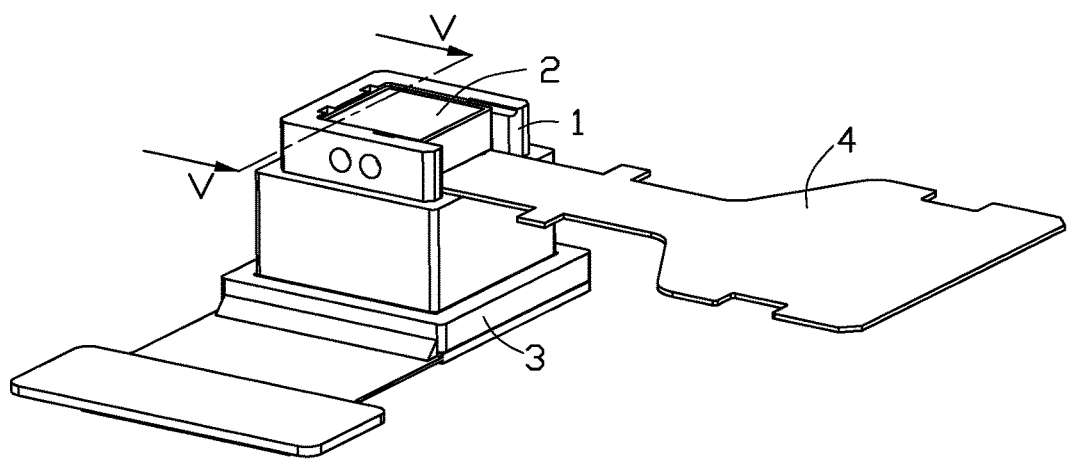
FIG. 1 is a perspective view of a camera assembly including a filter, a bearing block, and a lens module according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with a plurality of electric elements, such as capacitors, resistors, amplifiers, and the like.

In a traditional camera assembly for capturing spectral images, a filter is often subjected to stress from its own bearing block or stress from a clamping jig during a manufacturing process.

An embodiment of the present disclosure provides a camera assembly. The camera assembly can be applied to a terminal device for spectral images of objects. For example, the terminal device can be an instrument for detection (e.g., a multi-spectrometer) in technical fields such as medicine and food detection. The user can hold the detecting instrument, aim at an object, and press an image acquisition button of the instrument, so that the instrument captures a spectral image of the object at a certain wavelength. The spectral image contains not only image information, but also spectral information, thereby allowing the user to have a more comprehensive understanding of the object. The camera assembly can further be applied to a terminal device with a photographing function, for example, a mobile phone, a tablet computer, a digital camera, and the like.

FIG. 1 shows a camera assembly 100. The camera assembly 100 includes a bearing block 1, a filter 2, a lens module 3, and a flexible cable 4.

Figure 2:
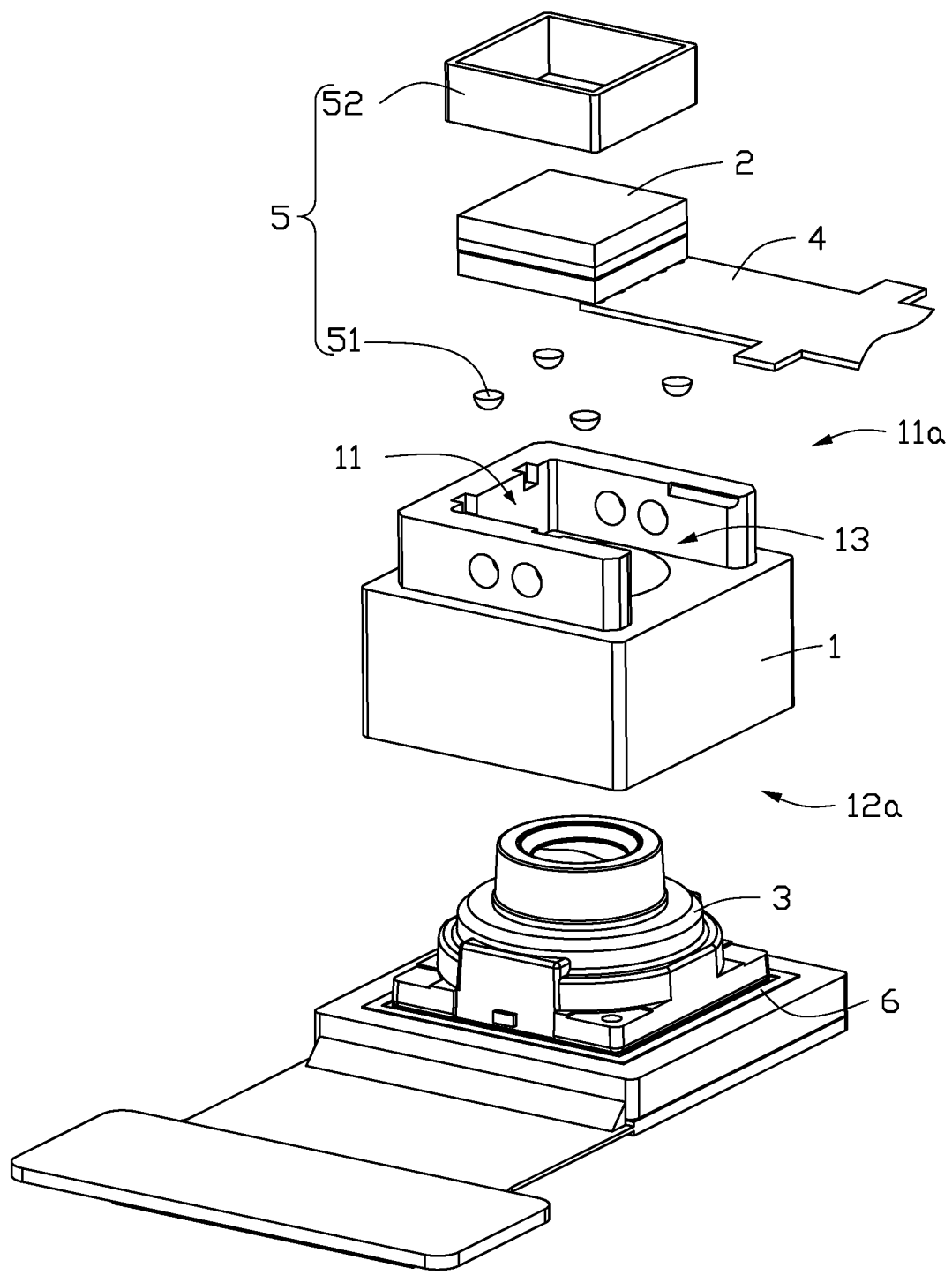
FIG. 2 is an exploded perspective view of the camera assembly in FIG. 1.

As shown in FIG. 2, the flexible cable 4 is electrically connected to the filter 2. The filter 2 and the bearing block 1 are connected by elastic glue 5. The lens module 3 and the bearing block 1 are connected by an adhesive 6. An optical axis of the filter 2 coincides with an optical axis of the lens module 3.

The light reflected by the object reaches the lens module 3 after passing through the filter 2. The filter 2 divides or separates the incident light into several narrow-band light beams to realize multi-spectral detection. The lens module 3 converts the narrow-band light beams into image signals.

Figure 3:
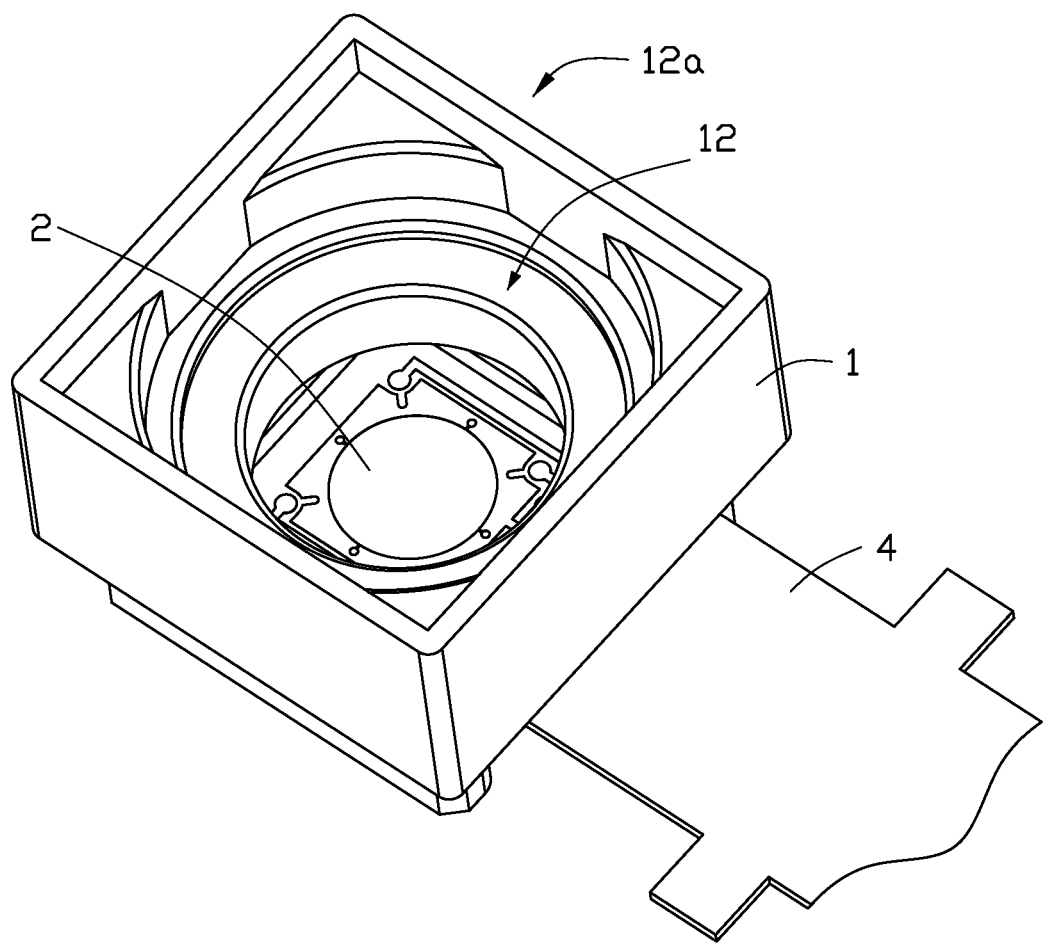
FIG. 3 is a perspective view of the filter and the bearing block in FIG. 1 from another perspective.

As shown in FIG. 2 and FIG. 3, the bearing block 1 includes a first end 11a and a second end 12a opposite to the first end 11a. The bearing block 1 defines a first receiving groove 11 penetrating the first end 11a and a second receiving groove 12 penetrating the second end 12a. The second receiving groove 12 communicates with the first receiving groove 11, and the first receiving groove 11 and the second receiving groove 12 penetrate through the bearing block 1.

The first receiving groove 11 and the second receiving groove 12 are coaxial. The filter 2 is in the first receiving groove 11, and the lens module 3 is in the second receiving groove 12.

The bearing block 1 defines a notch 13, the notch 13 communicates with the first receiving groove 11. One end of the flexible cable 4 connects the filter 2 and the other end of the flexible cable 4 extends from the notch 13.

Figure 4:
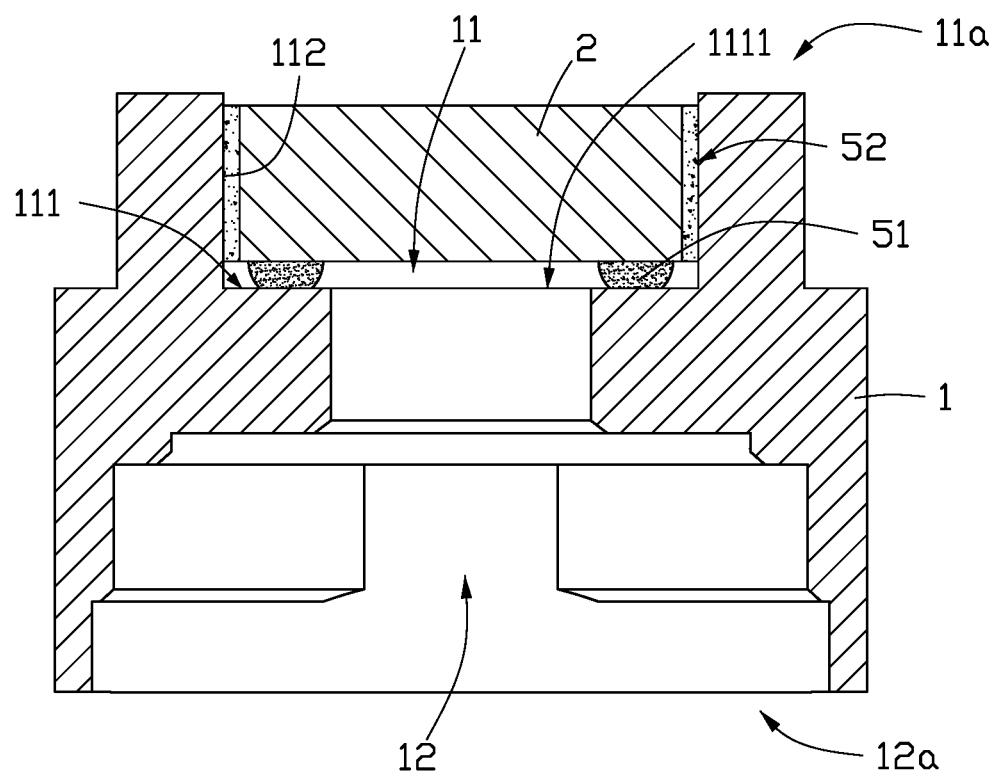
FIG. 4 is a cross-sectional view of the bearing block along line V-V of FIG. 1.

As shown in FIG. 4, the first receiving groove 11 includes a bottom 111 and a side wall 112 connects the bottom 111. An opening 1111 communicating with the second receiving groove 12 is defined in the bottom 111, so that the light enters the lens module 3 through the openings 1111 after passing through the filter 2. In one embodiment, the notch 13 is defined in the side wall 112.

The elastic glue 5 includes a first elastic glue 51 distributed between the bottom 111 and the filter 2 and a second elastic glue 52 distributed between the side wall 112 and the filter 2. The filter 2 is in the first receiving groove 11, connecting to the bottom 111 through the first elastic glue 51 and connecting to the side wall 112 through the second elastic glue 52.

The first elastic glue 51 is provided in a discrete manner between the bottom 111 and the filter 2, and is used for connecting and positioning the filter 2 and the bearing block 1.

A height of the first elastic glue 51 on the bottom 111 is controlled to be in the order of millimeters or less to ensure that inclination angle between the filter 2 and the lens module 3 is within 0.1° of the optimal angle.

In an embodiment, the first elastic glue 51 has viscoelasticity, and a loss factor tan δ of the first elastic glue 51 is less than 1 to provide shock absorption. If the elastic glue with a loss factor tan δ>1 is used, a drop standard test is likely to be failed.

In an embodiment, the first elastic glue 51 is a UV-curable glue. The UV-curable glue generates active free radicals or cations upon absorbing UV light, initiates monomer polymerization and cross-linking chemical reactions, and transforms the glue from a liquid state within a few seconds to a solid state. In other embodiments, the first elastic glue 51 can be other glues other than UV-curable glue.

Referring to FIGS. 2 through 4, the second elastic glue 52 is distributed in an unbroken manner between the side wall 112 and the filter 2 to reinforce the connection between the filter 2 and the bearing block 1.

In an embodiment, the second elastic glue 52 is viscoelastic, and a loss factor tan δ of the second elastic glue 52 is less than 1. The drop standard test means that the camera assembly is set at the four corners of a jig weighing 210g, and the jig is dropped from a height of 1-2 meters to a granite floor, and the camera assembly undergoes a total of 26 complete drops (including 6 faces×1 time, 8 corners×1 time, and 12 edges×1 time), the filtering effect of filter 2 must remain unchanged to pass such test.

In an embodiment, the second elastic adhesive 52 is a UV-curable adhesive. In other embodiments, the second elastic glue 52 can be other types of glues.

In an embodiment, the filter 2 is a tunable Fabry-Perot filter based on a microelectromechanical system (MEMS-FPF). In other embodiments, the filter 2 may be another type of filter.

For example, the filter 2 may be a filter including a liquid crystal panel and a polarizing plate, and the filter 2 achieves light filtering by adjusting distribution angles of the liquid crystal molecules in the liquid crystal panel to change the refractive index.

Figure 5:
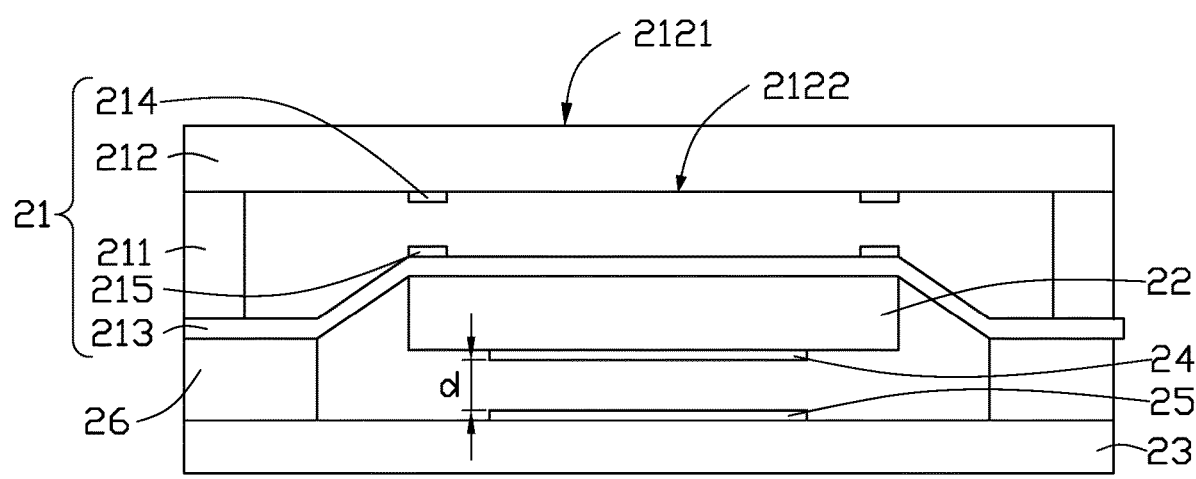
FIG. 5 is a schematic diagram of the filter in FIG. 1.

As shown in FIG. 5, the filter 2 includes a micro-actuating structure 21 based on MEMS, a first glass plate 22, a second glass plate 23, a first mirror coating 24, a second mirror coating 25, and a connecting portion 26.

The micro-actuating structure 21 includes a circuit substrate 212, an elastic beam 213, a support portion 211, a first driving electrode 214, and a second driving electrode 215. The circuit substrate 212 and the elastic beam 213 are opposite to each other. The support portion 211 is between the circuit substrate 212 and the elastic beam 213 and connects the circuit substrate 212 and the elastic beam 213. The circuit substrate 212 includes opposing first surfaces 2121 and second surfaces 2122. The second surface 2122 is closer than the first surface 2121 to the elastic beam 213. The first drive electrode 214 is on the second surface 2122. The second driving electrode 215 is on the surface of the elastic beam 213 close to the circuit substrate 212. The circuit substrate 212 is, for example, a patterned wafer.

The circuit substrate 212 further includes vias (not shown) penetrating the first surface 2121 and the second surface 2122, and a circuit 21211 (shown in FIG. 9) is on the first surface 2121 of the circuit substrate 212. The circuit 21211 and the first driving electrodes 214 are electrically connected through vias (e.g., vias of through-silicon). The circuit 21211 includes, for example, pads. The flexible cable 4 can be electrically connected to the filter 2 through the pads of the circuit 21211. When the camera assembly 100 is applied to a terminal device, the filter 2 can be electrically connected to a main board of the terminal device through the flexible cable 4, and then electrically connected to a processor of the terminal device through the main board. The range of filtering of the filter 2 can be controlled by the processor of the terminal device. In other embodiments, the camera assembly 100 can further include a processor, and the processor of the camera assembly is electrically connected to the flexible cable 4 and controls the filtering ranges of the filter 2. That is, the processor can be included in the camera assembly 100 or can be included in the terminal device to which the camera assembly 100 belongs.

The first glass plate 22 is on a side of the elastic beam 213 away from the circuit substrate 212. The second glass plate 23 is opposite to the first glass plate 22 and is connected to the side of the elastic beam 213 away from the circuit substrate 212 through the connecting portion 26. The first mirror coating layer 24 is on a surface of the first glass plate 22 close to the second glass plate 23, and the second mirror coating layer 25 is on a surface of the second glass plate 23 adjacent to the first glass plate 22. The first mirror coating 24 and the second mirror coating 25 are parallel to each other. Light enters the filter 2 from a side of the second glass plate 23 and is reflected between the first mirror coating layer 24 and the second mirror coating layer 25, and partially transmitted out of the circuit substrate 212. When the difference in optical paths of the light reflected between the first reflecting mirror coating layer 24 and the second reflecting mirror coating layer 25 is an integer multiple of the wavelength, there is constructive interference and light will be transmitted out of the circuit substrate 212. When the optical path difference of the light is not an integral multiple of the wavelength, destructive interference occurs, attenuating the light so it is not transmitted out of the circuit substrate 212. The optical path difference is related to the distance d between the first mirror coating layer 24 and the second mirror coating layer 25, and the micro-actuating structure 21 can adjust the size of the distance d.

The processor of the camera assembly 100 or the processor of the terminal device to which the camera assembly 100 belongs may pre-store a correspondence between the wavelengths allowed by the filter 2 and the distance d. The processor uses the flexible cable 4, the conductive circuit 21211, and the circuit substrate 212 to control a voltage applied to the first driving electrode 214, so that the voltage between the first driving electrode 214 and the second driving electrode 215 can be varied, so that the elastic beam 213 is deformed. Distance d between the first mirror coating layer 24 and the second mirror coating layers 25 changes, and the optical path difference of the light reflected between the first mirror coating layer 24 and the second mirror coating layer 25 will also change, so that the wavelength band of the light that can pass through the filter 2 is changed. The processor can thus adjust the filtering range of the filter 2 by adjusting the distance d, so that the light of the specified wavelength band is transmitted out of the circuit substrate 212, and the light of other wavelength bands is attenuated and not allowed to propagate.

Figure 6:
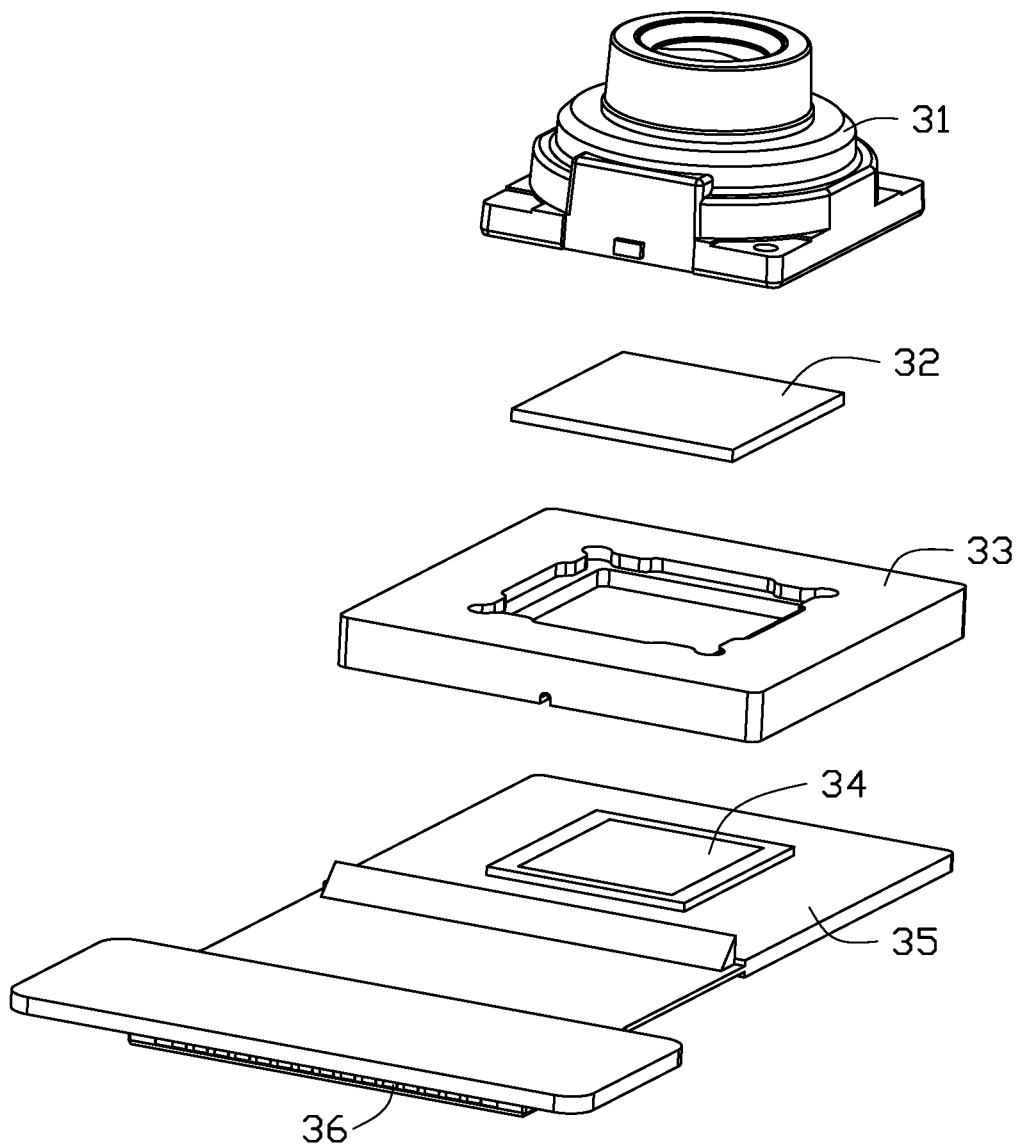
FIG. 6 is an exploded perspective view of the lens module of FIG. 1.

As shown in FIG. 6, the lens module 3 includes a lens 31, a filter element 32, a filter holder 33, a photosensitive element 34, a circuit board 35, and a connector 36.

The lens 31 is fixed on the filter holder 33; the filter element 32 is accommodated in the filter holder 33. The photosensitive element 34 is on the circuit board 35 and is electrically connected to the circuit board 35. The filter holder 33 is fixed on the circuit board 35, and the photosensitive element 34 is between the circuit board 35 and the filter holder 33. The connector 36 is connected to the circuit board 35.

The lens 31 takes the light passing through the filter 2, the lens can be adjustable. The filter element 32 is used to filter at least part of the noise captured in the lens 31 that interferes with the imaging quality. The filter holder 33 carries the filter element 32, supports the lens 31, and connects with the bearing block 1. The photosensitive element 34 converts the optical signals filtered by the filter element 32 into electrical signals. The circuit board 35 performs operations on the electrical signals transmitted by the photosensitive element 34. The connector 36 is connected to the circuit board 35. When the camera assembly 100 is applied to a terminal device, the connector 36 can be electrically connected to a main board of the terminal device and is electrically connected to a processor of the terminal device by the main board. The lens 31 is controlled by the processor to perform focusing. In other embodiments, the camera assembly 100 further includes a processor, and the processor of the camera assembly 100 is electrically connected to the circuit board, and controls the lens 31 to perform focusing, and thereby is able to increase the harvest of light of the lens module 3 and improve the spectral image.

The filter element 32 may be an ultraviolet filter, a visible filter, an infrared filter, an infrared cut-off filter, and so on. In one embodiment, the filter element 32 is an infrared-blocking filter, which can prevent infrared rays from passing through the lens of the camera to cause picture distortion.

The circuit board 35 can be a flexible board, a rigid board, or a flexible-rigid board.

Figure 7:
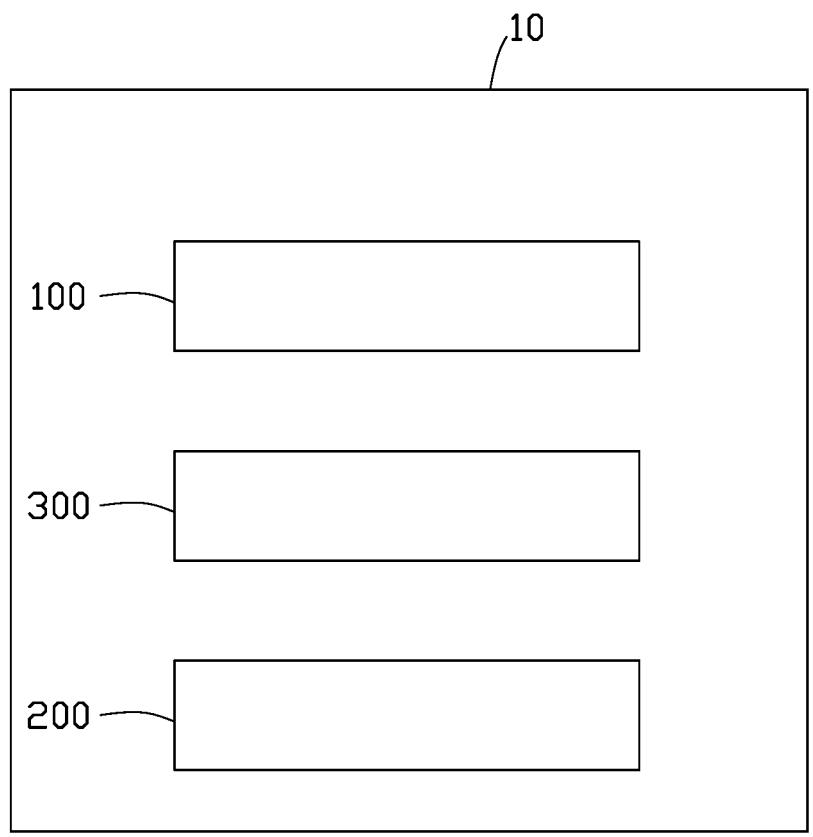
FIG. 7 is a schematic block diagram of a terminal device according to an embodiment of the present disclosure.

FIG. 7 shows a terminal device 10 according to an embodiment. The terminal device 10 is, for example, an instrument (e.g., a multi-spectrometer) applied in technical fields such as medicine and food detection. The terminal device 10 may also be a terminal device having a photographing function, for example, a mobile phone, a tablet computer, a digital camera, and the like.

The terminal device 10 includes a main board 200, a processor 300 and the camera assembly 100. The mainboard 200 is electrically connected to the processor 300. The flexible cable 4 of the camera assembly 100 is electrically connected to the main board 200, so that the filter 2 is electrically connected to the processor 300 of the terminal device 10 through the flexible cable 4. The processor 300 may be used to control the filtering range of the filter 2.

In some embodiments, the circuit board 35 is electrically connected to the main board 200 by the connector 36, so that the lens module 3 is connected to the processor 300. The processor 300 performs focusing on the lens 31. For example, the processor can adjust the allowable wavelength of the filter 2, and then adjust the position of the lens in the lens 31 according to the allowable wavelength, so that the allowable wavelength can be smoothly incident on the photosensitive element 34 and improve the light harvesting rate of the lens module 3. The clarity of the spectral image is improved.

Figure 8:
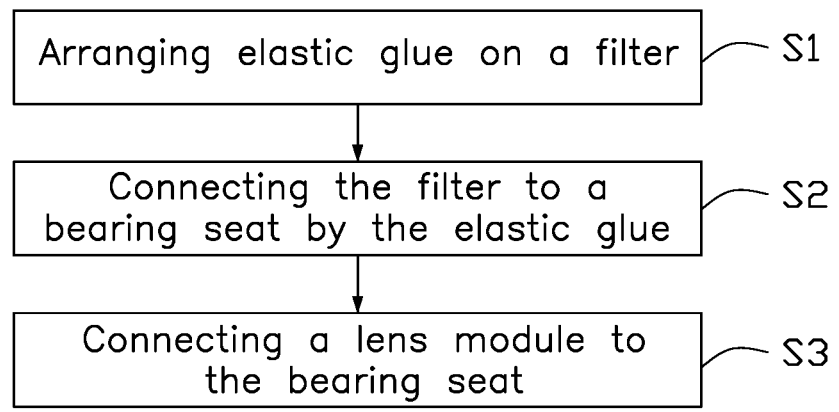
FIG. 8 is a flowchart of a method for manufacturing the camera assembly according to an embodiment of the present disclosure.

A method for manufacturing the camera assembly is further provided in FIG. 8. The method includes fixing a filter by vacuum adsorption, arranging elastic glue on the filter, and connecting the filter and a bearing block by elastic glue. The bearing block includes a first receiving groove and a second receiving groove communicating with the second receiving groove, the filter is accommodated in the first receiving groove. A lens module is accommodated in the second receiving groove.

In Block S1, elastic glue is arranged on the filter.

Figure 9:
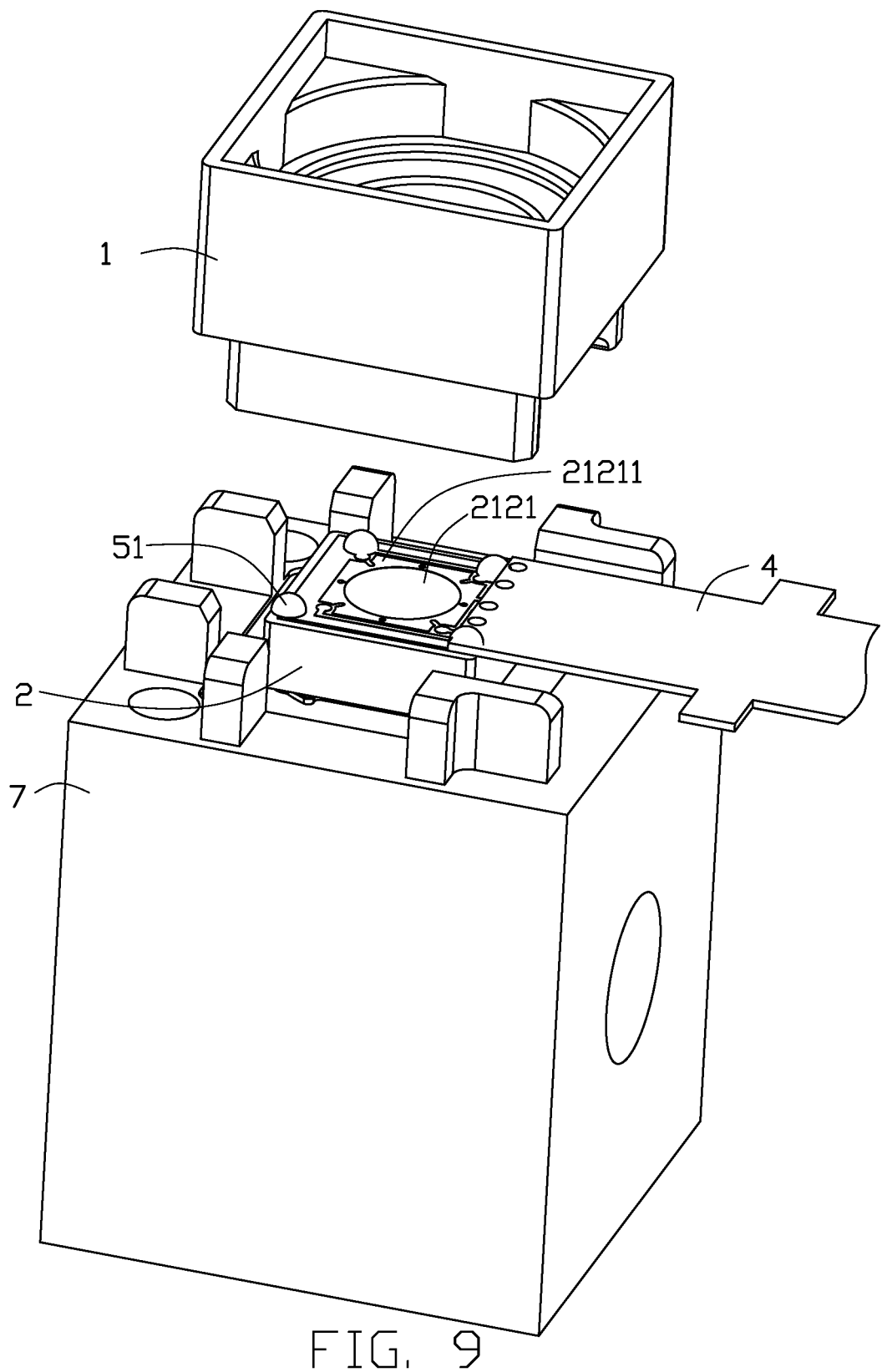
FIG. 9 is a schematic diagram of blocks S1 and S2 of the method in FIG. 8.

As shown in FIG. 9, the flexible cable 4 is welded to the circuit 21211 on the first surface 2121 of the filter 2.

An assembly platform 7 is provided, and the filter 2 is vacuum adsorbed on a surface of the assembly platform 7, and the first surface 2121 of the filter 2 faces upward. After the filter 2 is fixed on the assembly platform 7, a difference in plane height of the filter 2 on the assembly platform 7 is within 0.05 mm of optimal.

In the method, the filter is fixed by vacuum adsorption. Compared with the method of fixing the filter by clamping, the influence of the adsorption force generated by vacuum adsorption on the filter is insignificant, and the filter is not stressed.

The first elastic glues 51 are spaced apart from each other on the first surface 2121.

In block S2, the bearing block 1 as shown in FIG. 4 and FIG. 9 is provided, the filter 2 and the bearing block 1 are connected by the first elastic glue 51. The second elastic glue 52 is unbrokenly disposed on the side wall 112 to fill the gap between the filter 2 and the side wall 112.

In the method, the filter and the bearing block are connected by elastic glue, which avoids the problem of the filter being in direct contact with the bottom or side wall of the bearing block and thus receiving stress, affecting the filtering effect. Additionally, the elastic glue is used to achieve the effect of adhesion, fixation, and shock absorption, so as to reduce the damage to the structure of the filter when the camera components are subjected to external shocks.

In Block S3, the lens module is connected to the bearing block.

As shown in FIG. 9, the filter 2 is removed from the assembly platform 7.

Figure 10:
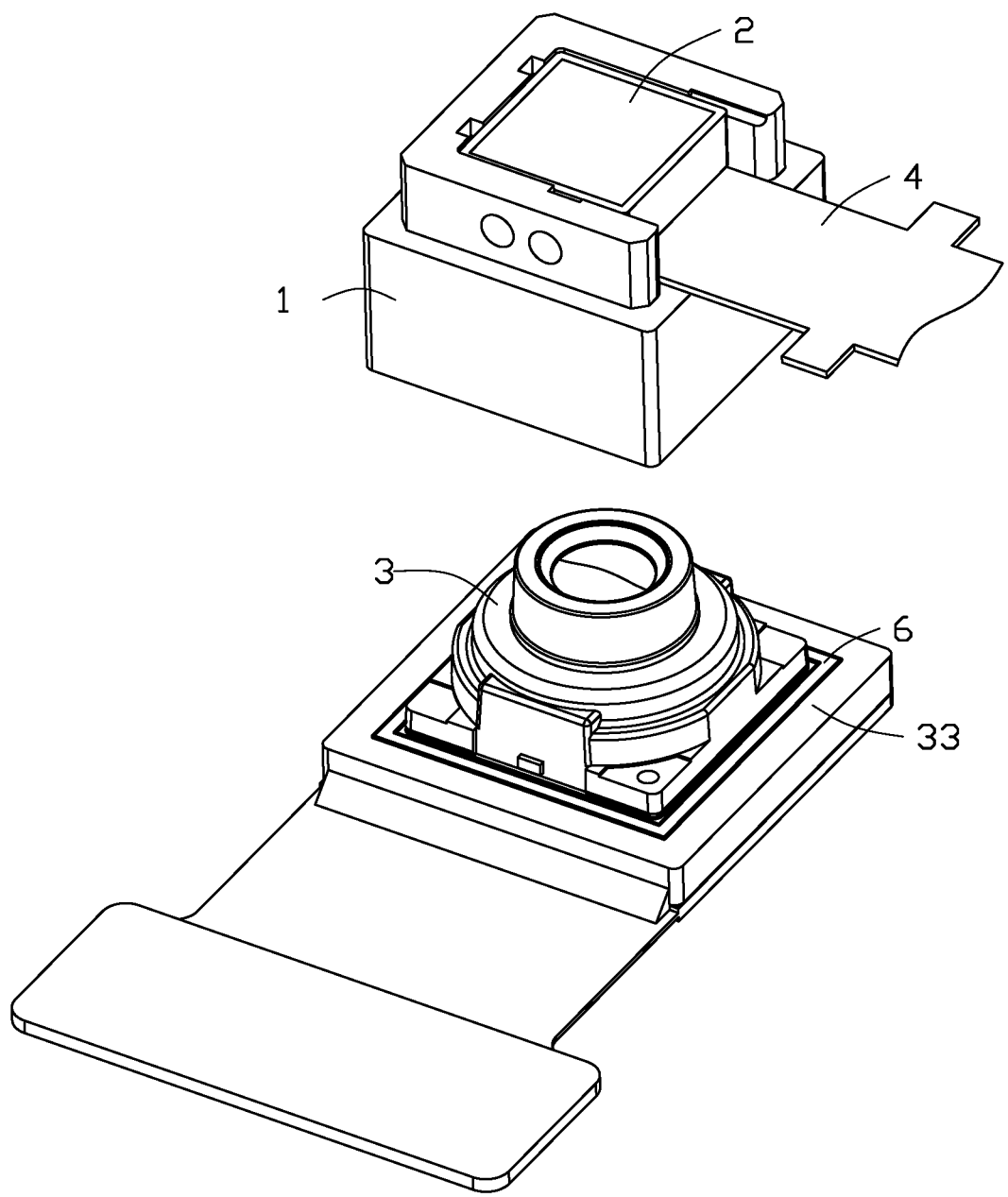
FIG. 10 is a schematic diagram of block S3 of the method in FIG. 8.

As shown in FIG. 10, an adhesive 6 is arranged on the surface of the filter holder 33, and the bearing block 1 and the lens module 3 are connected by adhesive 6.

In other embodiments, the filter 2 may be fixed by other structures.

The camera assembly completed by the above method can basically meet the requirement that the relative inclination angle between the filter 2 and the lens module 3 be within 0.1° of optimal.

The arrangement of the first elastic glue 51, the second elastic glue 52 and the adhesive 6 may be glue dispensing, scraping glue, rolling glue, and spraying glue.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A camera assembly comprising:
   a bearing block comprising a first end and a second end opposite to the first end, wherein the bearing block defines a first receiving groove penetrating the first end and a second receiving groove penetrating the second end, and the second receiving groove connects to the first receiving groove;
   a filter received in the first receiving groove and connected to the bearing block by elastic glue;
   a flexible cable electrically connected to the filter; and
   a lens module received in the second receiving groove;
   wherein an opening communicating with the second receiving groove is defined on a bottom of the first receiving groove, the first receiving groove further comprises a side wall connects the bottom, and the elastic glue comprises a first elastic glue distributed between the bottom and the filter, and a second elastic glue distributed between the side wall and the filter.

2. The camera assembly of claim 1, wherein the bearing block further comprises a notch communicating with the first receiving groove, and the flexible cable extends from the notch.

3. The camera assembly of claim 1, wherein the first elastic glue is provided in a discrete manner between the bottom and the filter.

4. The camera assembly of claim 1, wherein the second elastic glue is unbrokenly distributed between the side wall and the filter.

5. The camera assembly of claim 1, wherein both a loss factor of the first elastic glue and a loss factor of the second elastic glue are less than 1.

6. The camera assembly of claim 1, wherein the filter is micro electromechanical system Fabry-Perot filter.

7. A terminal device comprising:
   a main board;
   a processor; and
   a camera assembly comprising:
      a bearing block comprising a first end and a second end opposite to the first end, wherein the bearing block defines a first receiving groove penetrating the first end and a second receiving groove penetrating the second end, and the second receiving groove connects to the first receiving groove;
      a filter received in the first receiving groove and connected to the bearing block by elastic glue;
      a flexible cable electrically connected to the filter; and
      a lens module received in the second receiving groove;
   wherein the flexible cable is electrically connected to the main board, and the lens module is electrically connected to the processor by the main board;
   an opening communicating with the second receiving groove is defined on a bottom of the first receiving groove, the first receiving groove further comprises a side wall connects the bottom, and the elastic glue comprises a first elastic glue distributed between the bottom and the filter, and a second elastic glue distributed between the side wall and the filter.

8. The terminal device of claim 7, wherein the bearing block further comprises a notch communicating with the first receiving groove, and the flexible cable extends from the notch.

9. The terminal device of claim 7, wherein the first elastic glue is provided in a discrete manner between the bottom and the filter.

10. The terminal device of claim 7, wherein the second elastic glue is unbrokenly distributed between the side wall and the filter.

11. The terminal device of claim 7, wherein both a loss factor of the first elastic glue and a loss factor of the second elastic glue are less than 1.

12. The terminal device of claim 7, wherein the filter is micro electromechanical system Fabry-Perot filter.

13. A method of manufacturing a camera assembly, comprising:
   fixing a filter to an assembly platform by vacuum adsorption;
   arranging elastic glue on the filter;
   connecting the filter to a bearing block by the elastic glue, wherein the bearing block comprises a first end and a second end opposite to the first end, the bearing block defines a first receiving groove penetrating the first end and a second receiving groove penetrating the second end and communicating with the first receiving groove, the filter is received in the first receiving groove; and
   connecting a lens module to the bearing block, wherein the lens module is received in the second receiving groove;
   wherein arranging elastic glue comprises forming a first elastic glue between a bottom of the first receiving groove and the filter connects to the bottom by the first elastic glue, the first receiving groove further comprises a side wall connects the bottom; connecting the filter to the bearing block further comprises forming a second elastic glue between the side wall and the filter, and the filter connects to the side wall by the second elastic glue.

14. The method of manufacturing the camera assembly of claim 13, before fixing the filter to the assembly platform, the method further comprising electrically connecting a flexible cable to the filter.

\* \* \* \* \*